United States Patent
Tkach et al.

(10) Patent No.: US 10,419,480 B1
(45) Date of Patent: Sep. 17, 2019

(54) SYSTEM, METHOD, AND COMPUTER PROGRAM FOR REAL-TIME CYBER INTRUSION DETECTION AND INTRUDER IDENTITY ANALYSIS

(71) Applicant: Amdocs Development Limited, Limassol (CY)

(72) Inventors: Vladimir Tkach, Kfar Yona (IL); Nagina Eliav, Even Yehuda (IL)

(73) Assignee: AMDOCS DEVELOPMENT LIMITED, Limassol (CY)

( * ) Notice: Subject to any disclaimer, the term of this patent is extended or adjusted under 35 U.S.C. 154(b) by 120 days.

(21) Appl. No.: 15/686,003

(22) Filed: Aug. 24, 2017

(51) Int. Cl.
 *H04L 29/06* (2006.01)
(52) U.S. Cl.
 CPC ...... *H04L 63/1491* (2013.01); *H04L 63/1416* (2013.01); *H04L 63/1425* (2013.01); *H04L 63/168* (2013.01)
(58) Field of Classification Search
 CPC ............... H04L 63/1491; H04L 63/168; H04L 63/1416; H04L 63/1425
 See application file for complete search history.

(56) References Cited

U.S. PATENT DOCUMENTS

| | | | |
|---|---|---|---|
| 8,650,215 B2 | 2/2014 | Little | |
| 9,350,751 B2 | 5/2016 | Silva et al. | |
| 9,356,950 B2 | 5/2016 | Vissamsetty et al. | |
| 9,473,520 B2 | 10/2016 | Dixon et al. | |
| 9,553,886 B2 | 1/2017 | Touboul et al. | |
| 2002/0066034 A1* | 5/2002 | Schlossberg | G06F 21/552 726/23 |
| 2008/0016339 A1 | 1/2008 | Shukla | |
| 2016/0072838 A1* | 3/2016 | Kolton | H04L 63/145 726/23 |
| 2016/0080401 A1* | 3/2016 | Zhou | H04L 63/1416 726/1 |
| 2017/0134423 A1 | 5/2017 | Sysman et al. | |

FOREIGN PATENT DOCUMENTS

CN 104978519 A 10/2015

OTHER PUBLICATIONS

TrapX Security Inc., "Deception in Depth: The Architecture of Choice for Deception Technology," 2017, pp. 1-22, retrieved from https://deceive.trapx.com/rs/929-JEW-675/images/White_Paper_TrapX_DeceptioninDepth.pdf?utm_source=TrapX&utm_medium=Website.
GuadiCore, Aug. 8, 2017, pp. 1-8, as retrieved by the Internet Archive Wayback Machine, https://web.archive.org/web/20170808113342/https://www.guardicore.com/.
Illusive Networks, "Deceptions Everywhere," 2015, pp. 1-4, retrieved from https://www.illusivenetworks.com/deceptions-everywhere.

* cited by examiner

*Primary Examiner* — Meng Li
(74) *Attorney, Agent, or Firm* — Zilka-Kotab, P.C.

(57) ABSTRACT

A system, method, and computer program product are provided for real-time cyber intrusion detection and intruder identity analysis. In operation, an intrusion detection system detects an intrusion by a cyber intruder attempting to access a first area of a system utilizing an application programming interface layer (API) layer. The intrusion detection system directs the cyber intruder to a secure second area of the system that mimics the first area of the system via the API layer. Further, the intrusion detection system notifies a security system of the intrusion.

7 Claims, 10 Drawing Sheets

800

```
(function() {
    // log all calls to setArray
    var proxied = jQuery.fn.setArray;
    jQuery.fn.setArray = function() {
        console.log( this, arguments );
        return proxied.apply( this, arguments );
    };
})();
```

FIGURE 8

SYSTEM, METHOD, AND COMPUTER PROGRAM FOR REAL-TIME CYBER INTRUSION DETECTION AND INTRUDER IDENTITY ANALYSIS

FIELD OF THE INVENTION

The present invention relates to cyber intrusion detection, and more particularly to real-time cyber intrusion detection and intruder identity analysis.

BACKGROUND

Current intrusion detection systems include hardware based solutions such as firewall or proxy server implementations, human based solutions including security centers, and automated systems including monitoring logs. In the case of intruders, monitor systems typically notify a security center for maintenance. This maintenance may include blocking a particular internet protocol (IP) address and checking logs.

In these cases, once an analysis system (e.g. a hack checking system, etc.) becomes involved, there is not typically enough time to perform comprehensive checks to identity the intruder nor to check for ways to identify the particular hacking method used, especially in real time. Even if a defense system manages to block an intruder's IP address, the intruder usually will find a way to bypass that particular IP address and retry the same attack again.

At the end of an attack event, security personnel may begin to investigate the circumstances of the intrusion in order to prevent future attacks of the same type from the same hacking flow. The current process is time intensive and uses many human resources.

There is thus a need for addressing these and/or other issues associated with the prior art.

SUMMARY

A system, method, and computer program product are provided for real-time cyber intrusion detection and intruder identity analysis. In operation, an intrusion detection system detects an intrusion by a cyber intruder attempting to access a first area of a system utilizing an application programming interface layer (API) layer. The intrusion detection system directs the cyber intruder to a secure second area of the system that mimics the first area of the system via the API layer. Further, the intrusion detection system notifies a security system of the intrusion.

BRIEF DESCRIPTION OF THE DRAWINGS

FIG. 8 shows an example illustrating code for overriding/overloading existing functionality, in accordance with one embodiment.

DETAILED DESCRIPTION

Figure 1:
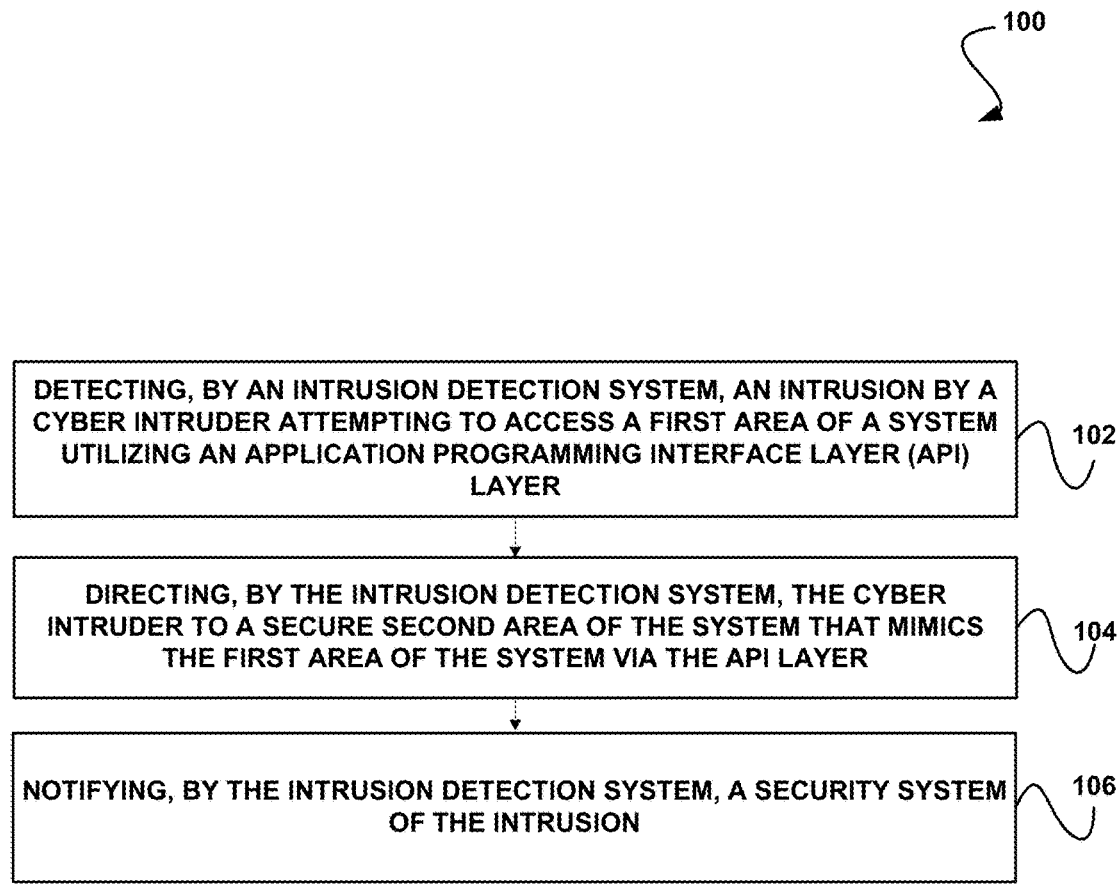
FIG. 1 illustrates a method for real-time cyber intrusion detection and intruder identity analysis, in accordance with one embodiment.

FIG. 1 illustrates a method 100 for real-time cyber intrusion detection and intruder identity analysis, in accordance with one embodiment.

In operation, an intrusion detection system detects an intrusion by a cyber intruder attempting to access a first area of a system utilizing an application programming interface layer (API) layer. See operation 102. The system may include any system targeted by an intruder, including servers, databases, etc.

The intrusion detection system directs the cyber intruder to a secure second area of the system that mimics the first area of the system via the API layer. See operation 104. The secure second area may include any secure area of the system. In one embodiment, the second area may include one or more fake databases. Further, in one embodiment, the second area may include fake data.

The intrusion detection system notifies a security system of the intrusion. See operation 106. The security system may include any system capable of being used to analyze or examine cyber intrusions.

In one embodiment, the intrusion detection system may notify the security system of a route taken by the intruder. For example, detecting the intrusion may include the intrusion detection system detecting an attempt to access the first area of the system (e.g. a database, etc.) by the cyber intruder. Further, the intrusion detection system may detect/identify an attempted route of the cyber intruder to access the first area of the system.

The intrusion detection system may then determine whether the attempted route is a predefined acceptable route to access the first area of the system. For example, the intrusion detection system may have access to and/or have stored one or more known predefined acceptable routes to the first area of the system. Thus, determining whether the attempted route is a predefined acceptable route may include comparing information associated with the attempted route (e.g. API routes taken, functions accessed, etc.) to information associated with one or more known predefined acceptable routes.

The intrusion detection system may direct the cyber intruder to the secure second area of the system if it is determined that the attempted route is not a predefined acceptable route. The intrusion detection system may then report the attempted route of the cyber intruder to the security system.

Of course, the intrusion detection system would allow access to the first area of the system if it is determined that the attempted route is a predefined acceptable route. Thus, the intrusion detection system enables real-time intrusion detection and identity analysis of intruders to the system.

It should be noted that the method 100 may be implemented utilizing various systems, hardware, software, applications, user interfaces, etc., as dictated by the implementer. For example, the intrusion detection system implementing the method 100 may include one or more processors, databases, etc., as well as implement various logic, computer code, applications, and/or user interfaces, etc.

More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

Figure 2:
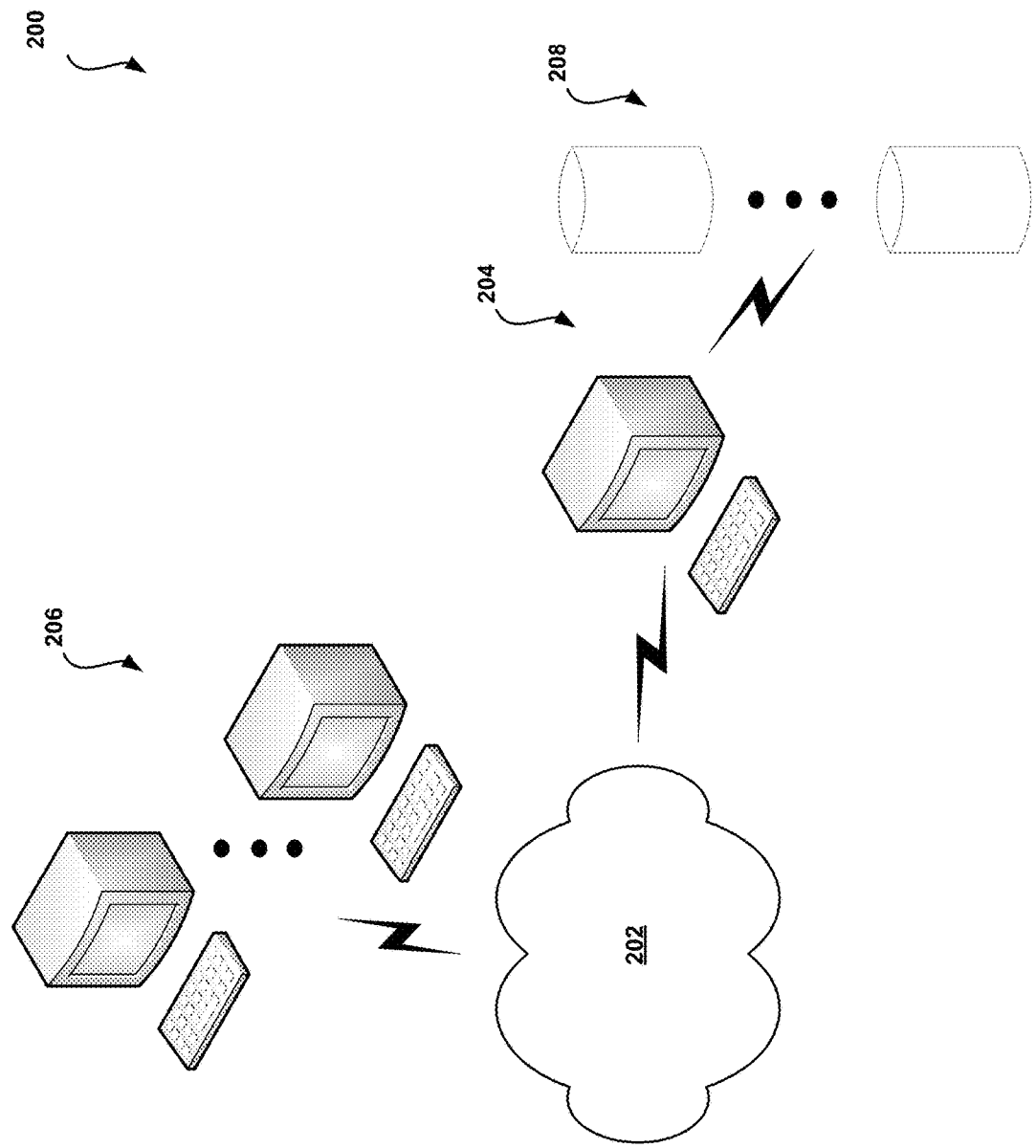
FIG. 2 shows a system for real-time cyber intrusion detection and intruder identity analysis, in accordance with one embodiment.

FIG. 2 shows a system 200 for real-time cyber intrusion detection and identity analysis, in accordance with one embodiment. As an option, the system 200 may be implemented in the context of the details of the previous figure and/or any subsequent figure(s). Of course, however, the system 200 may be implemented in the context of any desired environment. Further, the aforementioned definitions may equally apply to the description below.

As shown, the system 200 includes a system 204 including an intrusion detection system, which may implement a variety of applications or software, etc. The intrusion detection system of system 204 is capable of communicating with a plurality of external systems 206 that have access over one or more networks 202. The system 204 may also be in communication with one or more repositories/databases 208.

The intrusion detection system of the system 204 enables real-time intrusion detection and identity analysis of intruders to the system 204 and/or the repositories/databases 208. In operation, the intrusion detection system of the system 204 does not block the intruder. Instead, the intrusion detection system of the system 204 allows the intruder to enter an artificial area (e.g. a maze, etc.) to give the intruder the feeling that the intruder has reached a desired destination. In reality, the intruder will be routed to an artificial system or area of the system that is safe for the targeted system and closed to real data.

While the intruder is in this artificial location to which the intruder was directed, the intrusion detection system may identify the particular intrusion process utilized in real-time, identify the intruder, and notify security personnel with a full report about the circumstances of the intrusion incident.

The intrusion detection system of the system 204 will "cover" all of the target system functionality (e.g. the system 204 and/or the repositories/databases 208 in this example) in a layer (e.g. an API mapping layer) that allows the intrusion detection system to check the path taken against typical internal paths used to access the targeted area to fetch data. The intrusion detection system can use this layer to automatically verify the predefined API route to identify any non-standard use cases of the data entry path. In one embodiment, the intrusion detection system may utilize a machine learning process that will allow the intrusion detection system to identify and prevent future attack, based on information gleaned from previous attacks.

In one embodiment, the intrusion detection system may store real and verified/authorized paths/routes in a database indexed by a part of a Cross-Site Request Forgery (CSRF) token (e.g. expired and updated by session, etc.). Further, in one embodiment, the intrusion detection system may include an API mapper layer which is used to verify a path based on a predefined API route and discover, automatically, non-standard suspect use cases of the data entry path.

Figure 3:
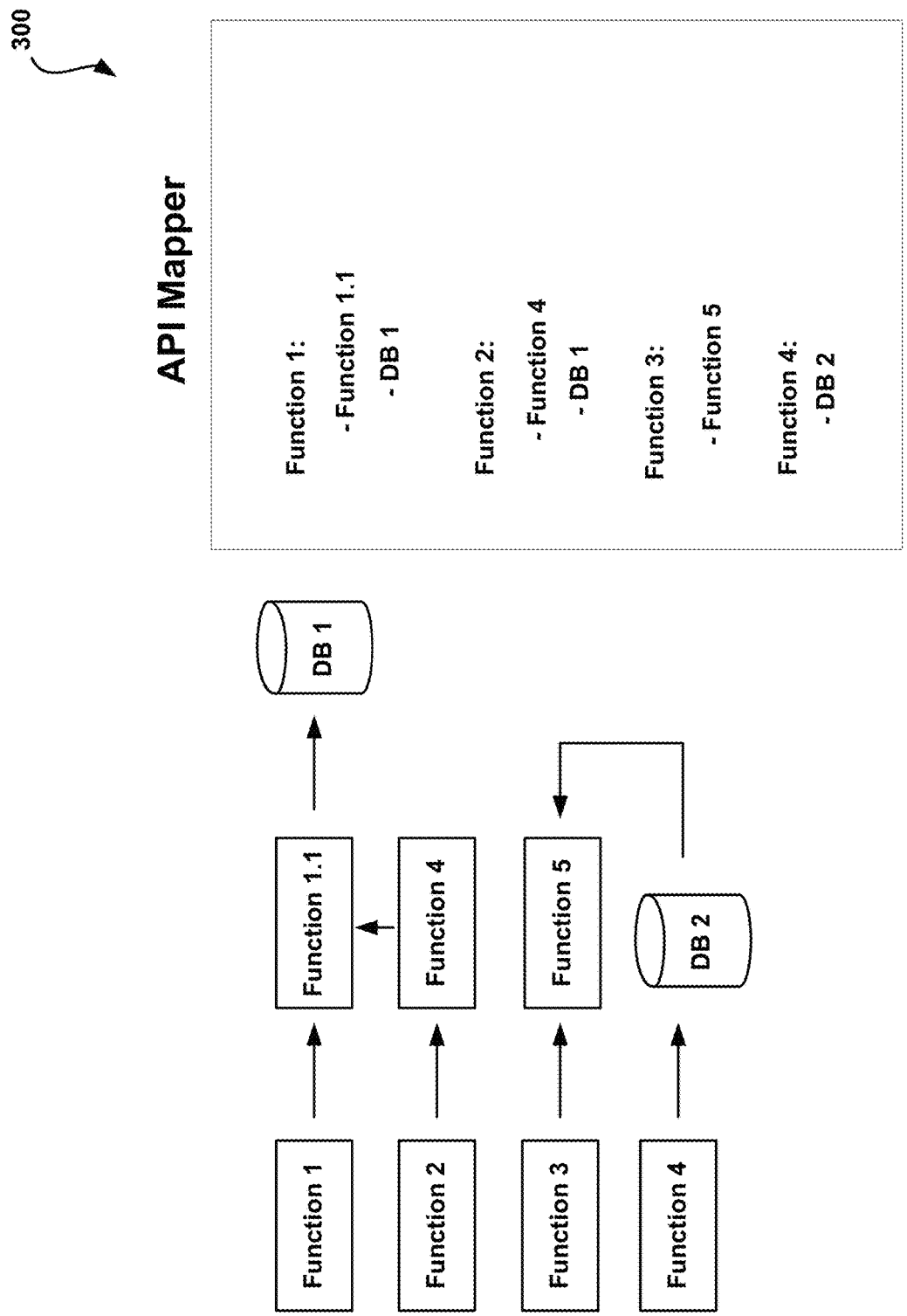
FIG. 3 shows a diagram for an API mapper with authorized API routes for real-time cyber intrusion detection and identity analysis, in accordance with one embodiment.

FIG. 3 shows a diagram 300 for an API mapper with authorized API routes for real-time cyber intrusion detection and identity analysis, in accordance with one embodiment. As an option, the diagram 300 may be implemented in the context of the details of the previous figures and/or any subsequent figure(s). Of course, however, the diagram 300 may be implemented in the context of any desired environment. Further, the aforementioned definitions may equally apply to the description below.

As shown, an API mapping layer that is included as part of an intrusion detection system includes a plurality of authorized route definitions to areas in a system (e.g. to one or more databases, etc.). In operation, the intrusion detection system detects an operator utilizing a first path to access a first area (e.g. a first database, etc.), compares that first path to a known authorized path to travel to the first area, and determines whether to allow the operator to access the first area accordingly. If the intrusion detection system determines that the first path taken by the operator is an authorized path, the intrusion detection system allows access to the first area.

If the intrusion detection system determines that the first path taken by the operator is not an authorized path, the intrusion detection system routes the operator to a second area that is a safe area of the system. While the operator is accessing the second area (which poses no threat to the target system), the intrusion detection system can notify a security system for real-time analysis of the threat and identification of the intruder. The intrusion detection system may provide information associated with the first path (e.g. the route information, etc.) so the security system can work to eliminate this vulnerable access point, etc.

Figure 4:
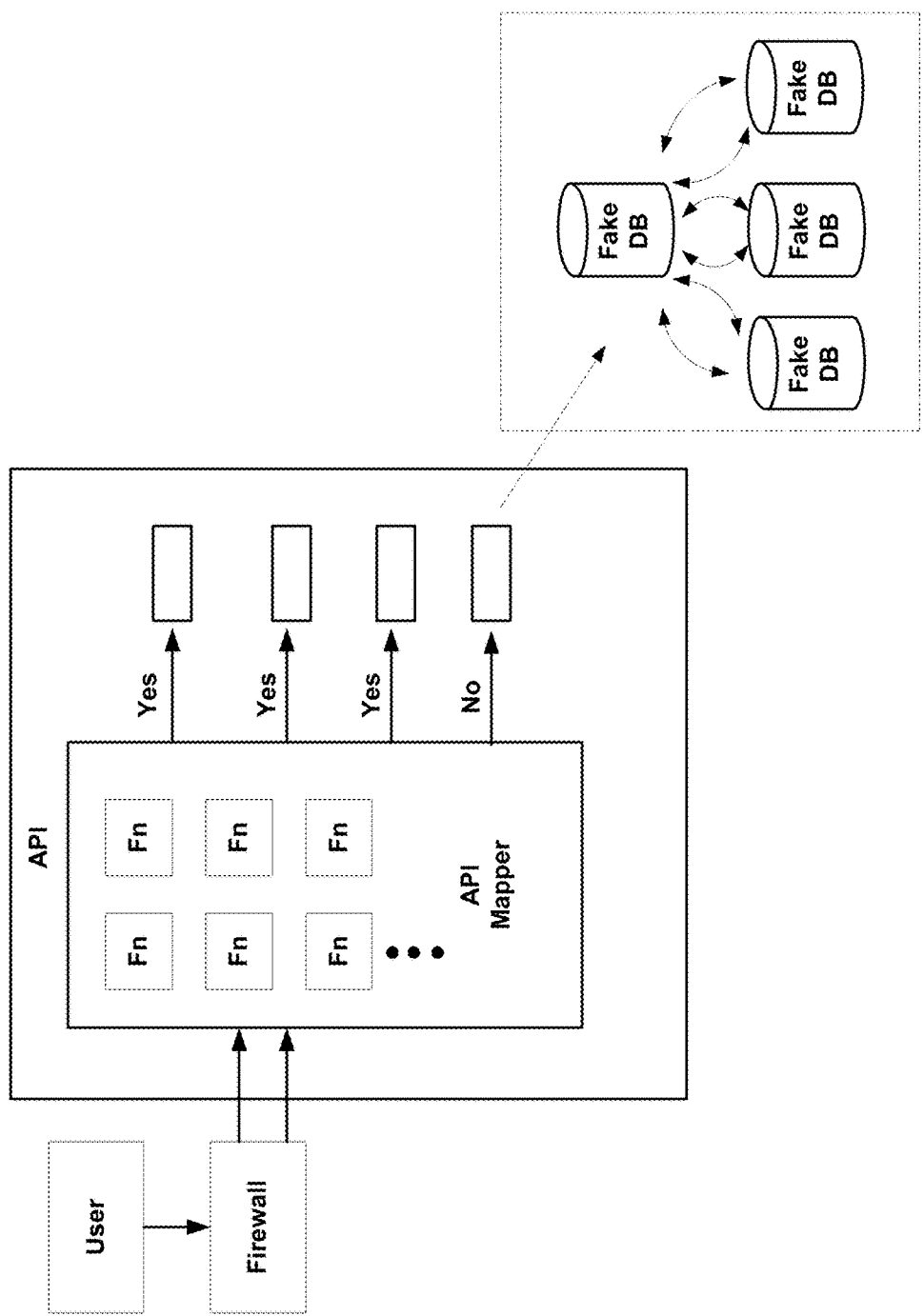
FIG. 4 shows a system flow diagram for real-time cyber intrusion detection and identity analysis, in accordance with one embodiment.

FIG. 4 shows a system flow diagram 400 for real-time cyber intrusion detection and identity analysis, in accordance with one embodiment. As an option, the system flow diagram 400 may be implemented in the context of the details of the previous figures and/or any subsequent figure(s). Of course, however, the system flow diagram 400 may be implemented in the context of any desired environment. Further, the aforementioned definitions may equally apply to the description below.

As shown, an API mapper portion of an intrusion detection system allows access to areas of a system if a user is accessing those areas of a system via an authorized route known to the intrusion detection system. If, on the other hand, the intrusion detection system detects that the user is trying to access an area of the system (e.g. a database, etc.) via an unauthorized route, the intrusion detection system directs the user to an area of the target system that is safe for the system. This may include, for example, routing the user to one or more fake databases (e.g. with fake data, etc.). While the user is exploring the safe area, analysis associated with the intrusion may be performed (e.g. by the intrusion detection system and/or a security system, etc.).

Figure 5:
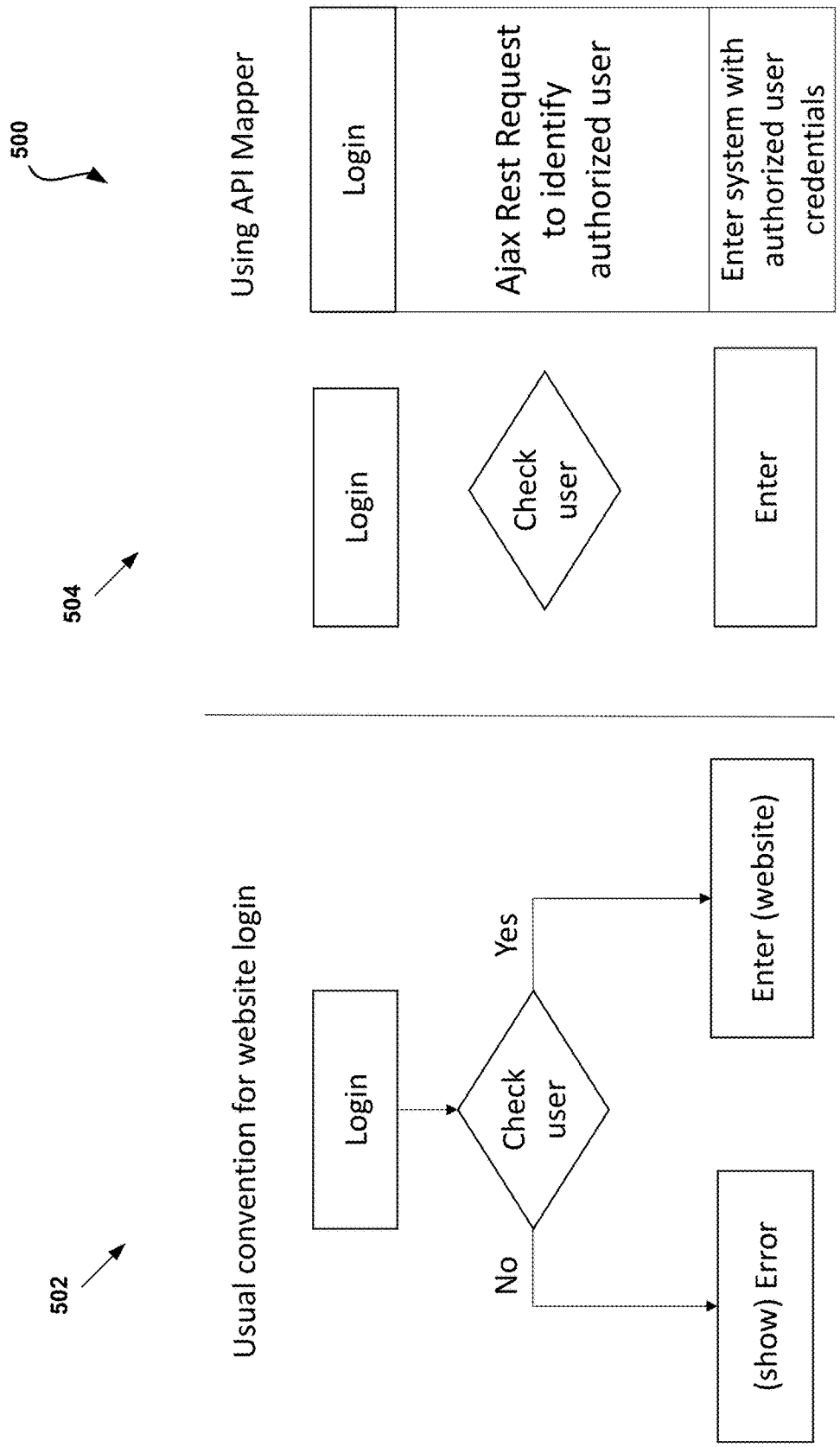
FIG. 5 shows a system flow diagram for logging into a website, in accordance with one embodiment.

FIG. 5 shows a system flow diagram 500 for logging into a website, in accordance with one embodiment. As an option, the system flow diagram 500 may be implemented in the context of the details of the previous figures and/or any subsequent figure(s). Of course, however, the system flow diagram 500 may be implemented in the context of any desired environment. Further, the aforementioned definitions may equally apply to the description below.

As shown, the method 502 shows a client side implementation of a standard login and the method 504 of FIG. 5 shows a website login utilizing an API mapper portion of an intrusion detection system.

In operation, a user logs into a website utilizing a device. In one embodiment, the intrusion detection system may utilize an Ajax Rest request to identify users. The user may then enter the target system utilizing authorized credentials.

Figure 6:
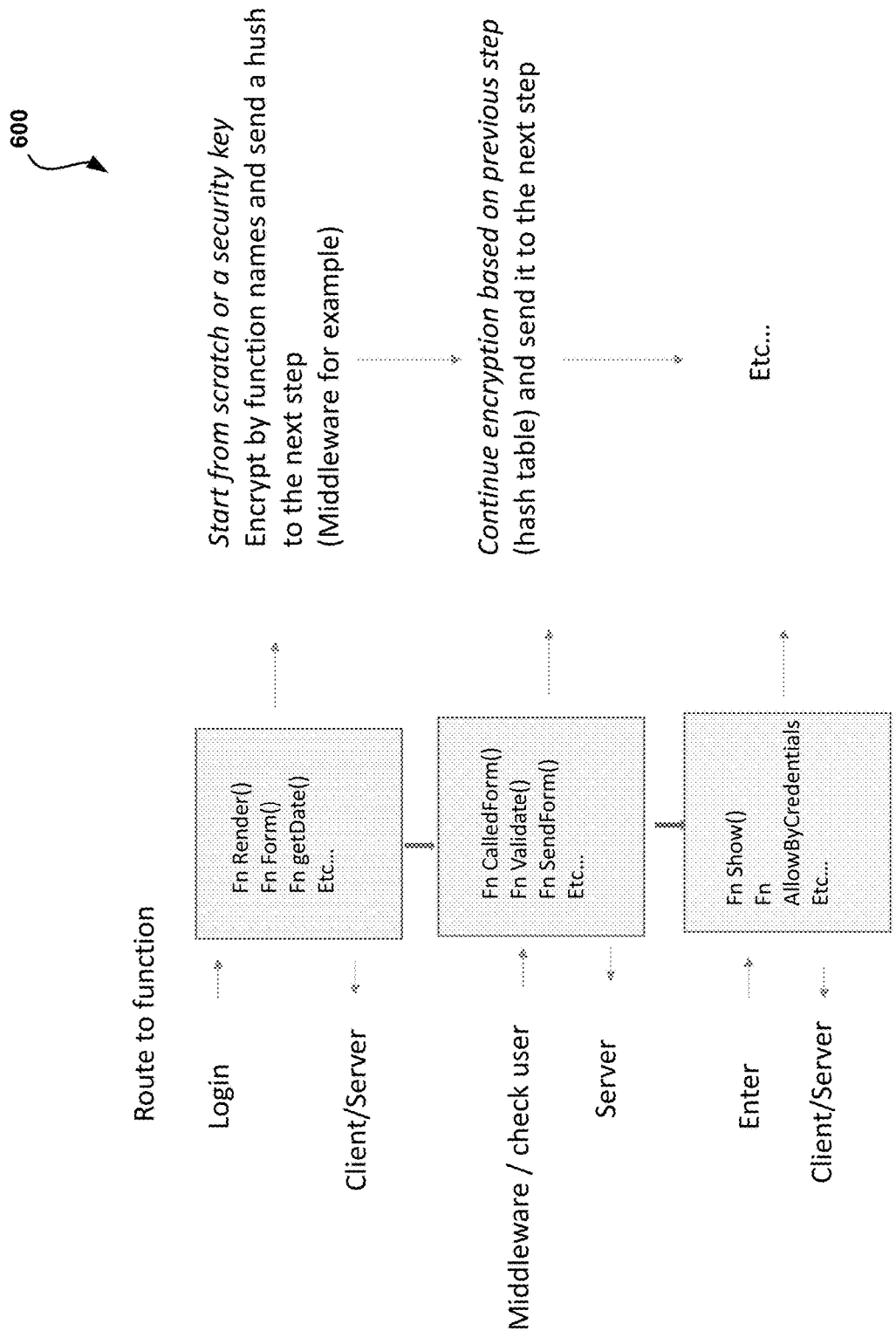
FIG. 6 shows a system flow diagram illustrating API Mapper layer functionality, in accordance with one embodiment.

FIG. 6 shows a system flow diagram 600 illustrating API Mapper layer functionality, in accordance with one embodiment. As an option, the system flow diagram 600 may be implemented in the context of the details of the previous figures and/or any subsequent figure(s). Of course, however, the system flow diagram 600 may be implemented in the context of any desired environment. Further, the aforementioned definitions may equally apply to the description below.

As shown, upon user login, in various embodiments, the intrusion detection system may start from scratch or a security key, encrypt by function name, and send a hush for the next step in the process (e.g. middleware, etc.). This information is sent to the client/server. Upon verification of the user, the intrusion detection system continues encryption based on the previous step (e.g. utilizing a hash table) and utilizes it for the next step of authorization.

Figure 7:
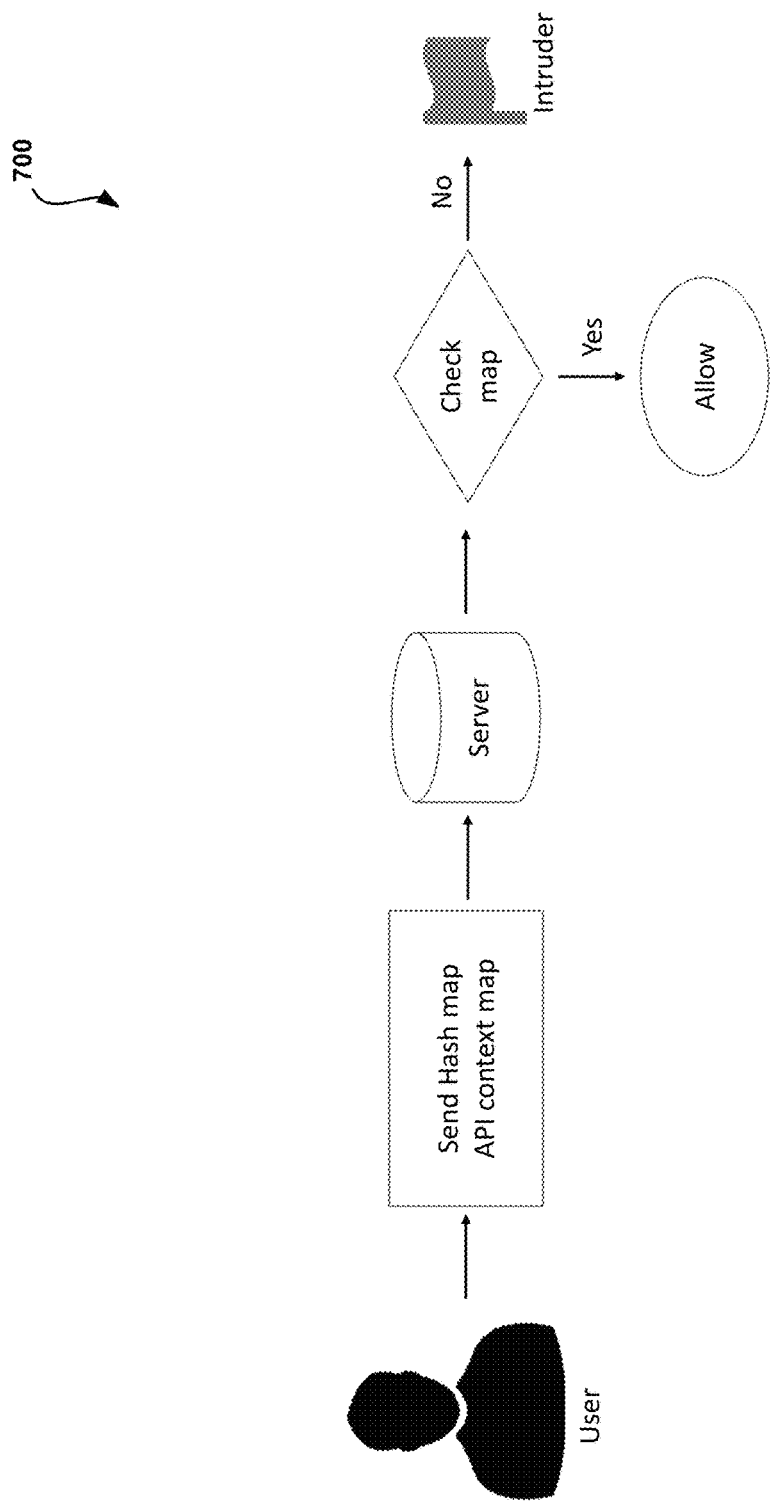
FIG. 7 shows a system flow diagram illustrating an intruder validation flow, in accordance with one embodiment.

FIG. 7 shows a system flow diagram 700 illustrating an intruder validation flow, in accordance with one embodiment. As an option, the system flow diagram 700 may be implemented in the context of the details of the previous figures and/or any subsequent figure(s). Of course, however, the system flow diagram 700 may be implemented in the context of any desired environment. Further, the aforementioned definitions may equally apply to the description below.

As shown, upon user interaction, a hash map and API context map are sent to a server. The intrusion detection system, utilizing an API mapper, utilizes this information to check the API context map and allow or disallow user access to an area of a target system based on the API context map.

FIG. 8 shows an example 800 illustrating code for overriding/overloading existing functionality, in accordance with one embodiment. As an option, the example 800 may be implemented in the context of the details of the previous figures and/or any subsequent figure(s). Of course, however, the example 800 may be implemented in the context of any desired environment. Further, the aforementioned definitions may equally apply to the description below.

In one embodiment, the example code 800 may be used by the intrusion detection system for overriding/overloading existing target system functionality by using "super" methodology.

Figure 9:
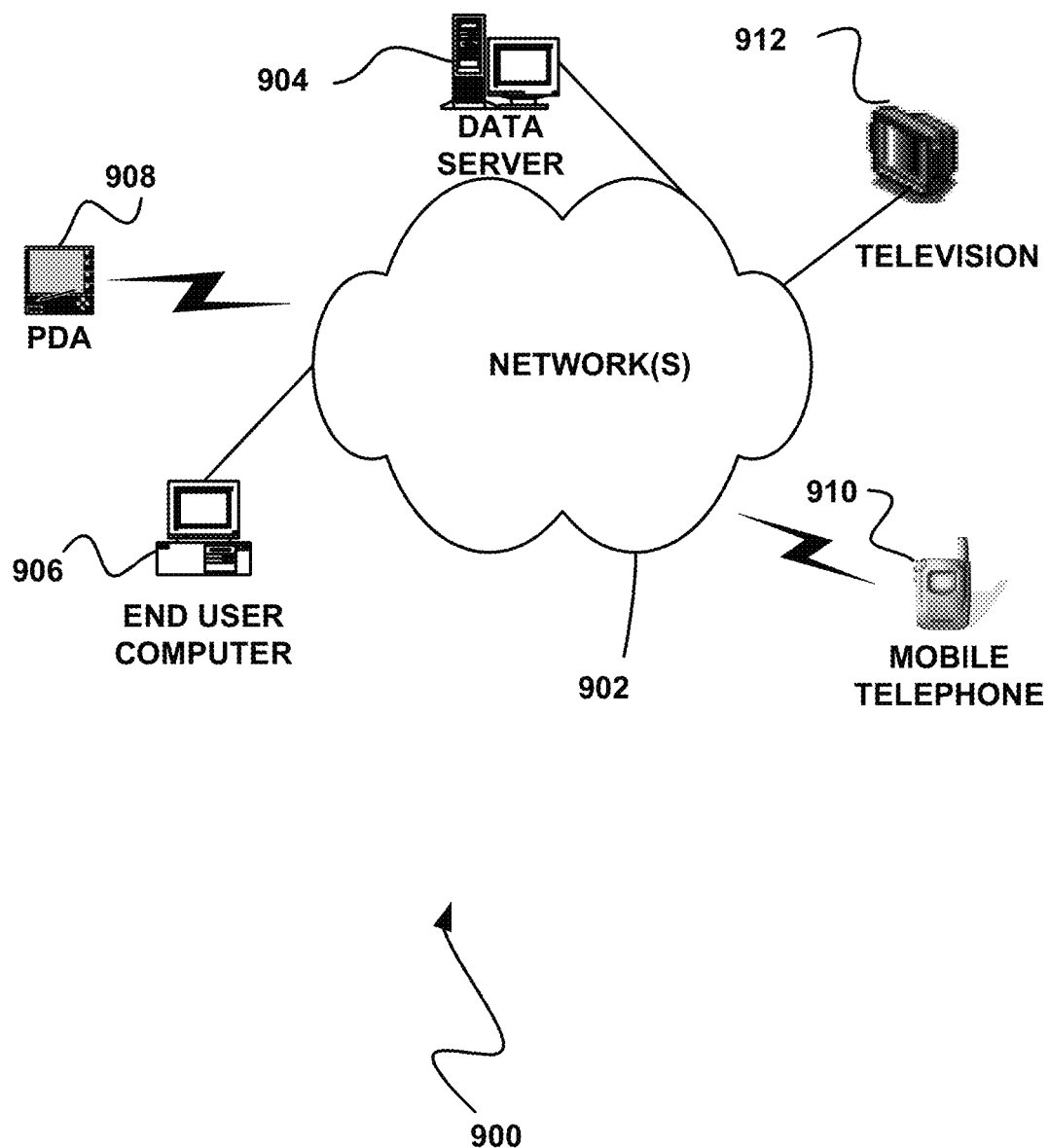
FIG. 9 illustrates a network architecture, in accordance with one possible embodiment.

FIG. 9 illustrates a network architecture 900, in accordance with one possible embodiment. As shown, at least one network 902 is provided. In the context of the present network architecture 900, the network 902 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 902 may be provided.

Coupled to the network 902 is a plurality of devices. For example, a server computer 904 and an end user computer 906 may be coupled to the network 902 for communication purposes. Such end user computer 906 may include a desktop computer, lap-top computer, and/or any other type of logic. Still yet, various other devices may be coupled to the network 902 including a personal digital assistant (PDA) device 908, a mobile phone device 910, a television 912, etc.

Figure 10:
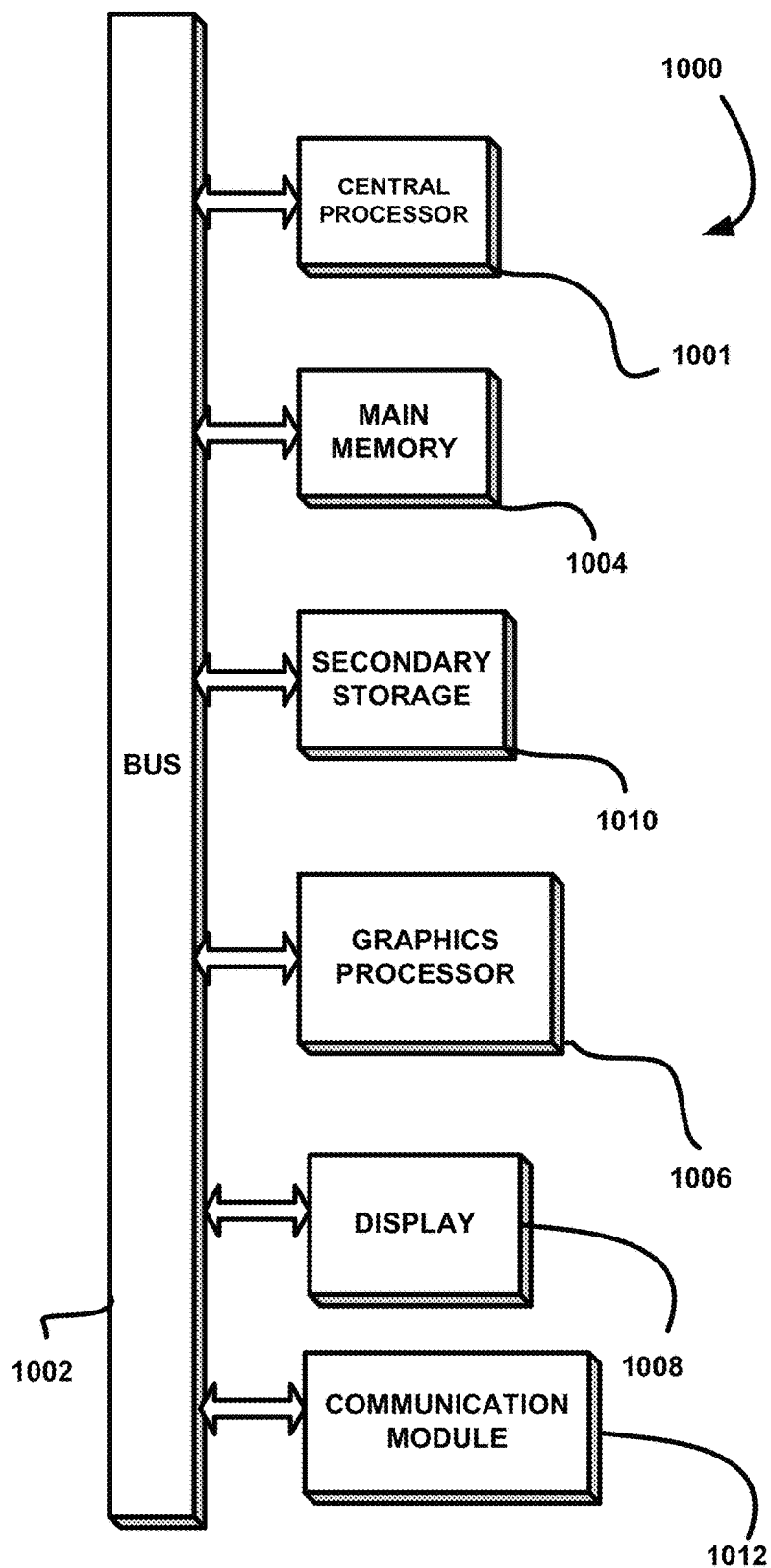
FIG. 10 illustrates an exemplary system, in accordance with one embodiment.

FIG. 10 illustrates an exemplary system 1000, in accordance with one embodiment. As an option, the system 1000 may be implemented in the context of any of the devices of the network architecture 900 of FIG. 9. Of course, the system 1000 may be implemented in any desired environment.

As shown, a system 1000 is provided including at least one central processor 1001 which is connected to a communication bus 1002. The system 1000 also includes main memory 1004 [e.g. random access memory (RAM), etc.]. The system 1000 also includes a graphics processor 1006 and a display 1008.

The system 1000 may also include a secondary storage 1010. The secondary storage 1010 includes, for example, a hard disk drive and/or a removable storage drive, representing a floppy disk drive, a magnetic tape drive, a compact disk drive, etc. The removable storage drive reads from and/or writes to a removable storage unit in a well-known manner.

Computer programs, or computer control logic algorithms, may be stored in the main memory 1004, the secondary storage 1010, and/or any other memory, for that matter. Such computer programs, when executed, enable the system 1000 to perform various functions (as set forth above, for example). Memory 1004, storage 1010 and/or any other storage are possible examples of non-transitory computer-readable media.

The system 1000 may also include one or more communication modules 1012. The communication module 1012 may be operable to facilitate communication between the system 1000 and one or more networks, and/or with one or more devices through a variety of possible standard or proprietary communication protocols (e.g. via Bluetooth, Near Field Communication (NFC), Cellular communication, etc.).

As used here, a "computer-readable medium" includes one or more of any suitable media for storing the executable instructions of a computer program such that the instruction execution machine, system, apparatus, or device may read (or fetch) the instructions from the computer readable medium and execute the instructions for carrying out the described methods. Suitable storage formats include one or more of an electronic, magnetic, optical, and electromagnetic format. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

It should be understood that the arrangement of components illustrated in the Figures described are exemplary and that other arrangements are possible. It should also be understood that the various system components (and means) defined by the claims, described below, and illustrated in the various block diagrams represent logical components in some systems configured according to the subject matter disclosed herein.

For example, one or more of these system components (and means) may be realized, in whole or in part, by at least some of the components illustrated in the arrangements illustrated in the described Figures. In addition, while at least one of these components are implemented at least partially as an electronic hardware component, and therefore constitutes a machine, the other components may be implemented in software that when included in an execution environment constitutes a machine, hardware, or a combination of software and hardware.

More particularly, at least one component defined by the claims is implemented at least partially as an electronic hardware component, such as an instruction execution machine (e.g., a processor-based or processor-containing machine) and/or as specialized circuits or circuitry (e.g., discreet logic gates interconnected to perform a specialized function). Other components may be implemented in software, hardware, or a combination of software and hardware. Moreover, some or all of these other components may be combined, some may be omitted altogether, and additional components may be added while still achieving the functionality described herein. Thus, the subject matter described herein may be embodied in many different variations, and all such variations are contemplated to be within the scope of what is claimed.

In the description above, the subject matter is described with reference to acts and symbolic representations of operations that are performed by one or more devices, unless indicated otherwise. As such, it will be understood that such acts and operations, which are at times referred to as being computer-executed, include the manipulation by the processor of data in a structured form. This manipulation transforms the data or maintains it at locations in the memory system of the computer, which reconfigures or otherwise alters the operation of the device in a manner well understood by those skilled in the art. The data is maintained at physical locations of the memory as data structures that have particular properties defined by the format of the data. However, while the subject matter is being described in the foregoing context, it is not meant to be limiting as those of skill in the art will appreciate that several of the acts and operations described hereinafter may also be implemented in hardware.

To facilitate an understanding of the subject matter described herein, many aspects are described in terms of sequences of actions. At least one of these aspects defined by the claims is performed by an electronic hardware component. For example, it will be recognized that the various actions may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly contradicted by context The use of the terms "a" and "an" and "the" and similar referents in the context of describing the subject matter (particularly in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims as set forth hereinafter together with any equivalents thereof entitled to. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

The embodiments described herein included the one or more modes known to the inventor for carrying out the claimed subject matter. Of course, variations of those embodiments will become apparent to those of ordinary skill in the art upon reading the foregoing description. The inventor expects skilled artisans to employ such variations as appropriate, and the inventor intends for the claimed subject matter to be practiced otherwise than as specifically described herein. Accordingly, this claimed subject matter includes all modifications and equivalents of the subject matter recited in the claims appended hereto as permitted by applicable law. Moreover, any combination of the above-described elements in all possible variations thereof is encompassed unless otherwise indicated herein or otherwise clearly contradicted by context.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method, comprising:
   storing, by an intrusion detection system, an indication of one or more authorized application programming interface (API) routes for accessing a first area of a system, the one or more authorized API routes being routes within an API layer of the system authorized for providing access to the first area of the system;
   detecting, by the intrusion detection system, an API route within the API layer taken by a source in an attempt to access the first area of the system;
   determining, by the intrusion detection system, that the API route taken by the source in the attempt to access the first area of the system is not one of the one or more authorized API routes;
   responsive to determining that the API route is not one of the one or more authorized API routes, detecting, by the intrusion detection system, the attempt as an intrusion by a cyber intruder that utilizes the API layer;
   directing, by the intrusion detection system, the cyber intruder to a secure second area of the system via the API layer, the secure second area of the system mimicking the first area of the system; and
   notifying, by the intrusion detection system, a security system of the intrusion.

2. The method of claim 1, wherein notifying the security system of the intrusion includes reporting to the security system the API route taken by the source in the attempt to access the first area of the system.

3. The method of claim 1, wherein the one or more authorized API routes are typical internal paths used to access the first area of the system area to fetch data.

4. The method of claim 1, wherein the first area of the system is a database.

5. A non-transitory computer readable medium storing computer code executable by a processor of an intrusion detection system to perform a method comprising:

storing, by the intrusion detection system, an indication of one or more authorized application programming interface (API) routes for accessing a first area of a system, the one or more authorized API routes being routes within an API layer of the system authorized for providing access to the first area of the system;

detecting, by the intrusion detection system, an API route within the API layer taken by a source in an attempt to access the first area of the system;

determining, by the intrusion detection system, that the API route taken by the source in the attempt to access the first area of the system is not one of the one or more authorized API routes;

responsive to determining that the API route is not one of the one or more authorized API routes, detecting, by the intrusion detection system, the attempt as an intrusion by a cyber intruder that utilizes the API layer;

directing, by the intrusion detection system, the cyber intruder to a secure second area of the system via the API layer, the secure second area of the system mimicking the first area of the system; and notifying, by the intrusion detection system, a security system of the intrusion.

6. The non-transitory computer readable medium of claim 5, wherein notifying the security system of the intrusion includes reporting to the security system the API route taken by the source in the attempt to access the first area of the system.

7. An intrusion detection system, comprising one or more hardware processors, configured for:

storing, by the intrusion detection system, an indication of one or more authorized application programming interface (API) routes for accessing a first area of a system, the one or more authorized API routes being routes within an API layer of the system authorized for providing access to the first area of the system;

detecting, by the intrusion detection system, an API route within the API layer taken by a source in an attempt to access the first area of the system;

determining, by the intrusion detection system, that the API route taken by the source in the attempt to access the first area of the system is not one of the one or more authorized API routes;

responsive to determining that the API route is not one of the one or more authorized API routes, detecting, by the intrusion detection system, the attempt as an intrusion by a cyber intruder that utilizes the API layer;

directing, by the intrusion detection system, the cyber intruder to a secure second area of the system via the API layer, the secure second area of the system mimicking the first area of the system; and notifying, by the intrusion detection system, a security system of the intrusion.

* * * * *